(12) United States Patent
Sumiyashiki et al.

(10) Patent No.: US 6,883,742 B2
(45) Date of Patent: Apr. 26, 2005

(54) WEBBING RETRACTOR

(75) Inventors: Akira Sumiyashiki, Aichi-ken (JP); Tomonori Nagata, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/636,967

(22) Filed: Aug. 8, 2003

(65) Prior Publication Data

US 2004/0079827 A1 Apr. 29, 2004

(30) Foreign Application Priority Data

Aug. 9, 2002 (JP) ........................................ 2002-233936

(51) Int. Cl.⁷ ........................ B60R 22/405; B60R 22/41
(52) U.S. Cl. ............................. 242/383.1; 242/383.2; 242/384.6
(58) Field of Search ..................... 242/383.1, 383.2, 242/383.4, 383.5, 384.1, 384.6; 280/806; 297/478

(56) References Cited

U.S. PATENT DOCUMENTS

| | | | |
|---|---|---|---|
| 4,485,986 A | 12/1984 | Sugimoto | |
| 5,314,137 A | 5/1994 | Fujimura et al. | |
| 5,826,813 A | * 10/1998 | Hibata | ............ 242/383.1 |
| 6,152,393 A | * 11/2000 | Ando et al. | ............ 242/383.1 |

FOREIGN PATENT DOCUMENTS

| | | |
|---|---|---|
| EP | 0 273 584 A1 | 7/1988 |
| EP | 0 934 856 A1 | 8/1999 |
| JP | 04-29460 | 3/1992 |
| JP | 04-35054 | 3/1992 |
| JP | 09-058410 | 3/1997 |

OTHER PUBLICATIONS

European Search Report dated Dec. 19, 2003.

* cited by examiner

*Primary Examiner*—John M. Jillions
(74) *Attorney, Agent, or Firm*—Nixon Peabody LLP

(57) ABSTRACT

A webbing retractor includes a take-up shaft, an inertia plate provided integrally and coaxially with the take-up shaft, and an inertial force imparting mechanism. When a webbing for restraining a vehicle occupant is suddenly pulled-out, the take-up shaft takes-up the webbing, and the inertia plate causes a rotational delay with respect to the take-up shaft, and rotation of the take-up shaft in a webbing pull-out direction is thereby locked. Further, the inertial force imparting mechanism that suppresses and deters rotation of the inertia plate in a webbing take-up rotation direction by the inertial force imparting mechanism applying inertial force in a webbing pull-out rotation direction to the inertia plate which attempts to rotate in a webbing take-up direction even after rotation of the take-up shaft in the webbing take-up rotation direction has stopped when a vehicle occupant cancels an applied state of the webbing and the entire webbing is taken-up.

16 Claims, 8 Drawing Sheets

WEBBING RETRACTOR

CROSS-REFERENCE TO RELATED APPLICATION

This application claims priority under 35 USC 119 from Japanese Patent Application No. 2002-233936, the disclosure of which is incorporated by reference herein.

BACKGROUND OF THE INVENTION

1. Field of the Invention

The present invention relates to a webbing retractor which stops rotation of a take-up shaft in a webbing pull-out direction, which rotation is caused by sudden pulling-out of a webbing.

2. Description of the Related Art

As locking mechanisms for webbing retractors which take-up, in the form of a roll, a webbing for restraining a vehicle occupant, there are a so-called WSIR (webbing sensitive inertia reel) and a VSIR (vehicle sensitive inertia reel). A WSIR senses sudden pulling-out of a webbing, and impedes rotation of a spool (take-up shaft) in the webbing pull-out direction. A VSIR senses a state of rapid deceleration of the vehicle, and impedes rotation of the spool (take-up shaft) in the webbing pull-out direction.

An example of the former mechanism will be briefly described. Both axial direction end portions of the spool, to which the proximal end portion of the webbing is anchored, are supported so as to be freely rotatable at side portions of a frame which is formed in a substantial U shape as seen in plan view. A gear, which is made of resin and is called a V gear, is mounted, so as to be relatively rotatable, to one axial direction end portion of the spool. An inertia plate formed of resin is assembled with the V gear so as to be relatively rotatable. A lock plate, which is formed in a substantial U shape as seen in plan view, is accommodated at the spool so as to be movable in the radial direction.

The lock plate as well is disposed within the shaft diameter of the spool since relative rotation usually does not arise among the spool, the V gear and the inertia plate. When the webbing is suddenly pulled out from this state, the spool, at which the proximal end of the webbing is anchored, attempts to rotate in the webbing pull-out direction. On the other hand, the inertia plate attempts or remain in its place. Thus, relative rotation arises between the inertia plate and the spool. A pawl, which is attached to the V gear, is thereby pushed by the inertia plate, and engages with internal teeth which are formed in a resin cover which is called a sensor cover. As a result, a state arises in which rotation of the V gear in the webbing pull-out direction is impeded, and relative rotation arises between the V gear and the spool. When relative rotation arises between the V gear and the spool, the lock plate is guided by a guide hole formed in the V gear, and the lock plate moves toward the radial direction outer side of the spool. Lock teeth formed at the distal end portions thereof engage with internal ratchets formed in the both side portions of the frame. In this way, rotation of the spool in the webbing pull-out direction is impeded. (Namely, a locked state arises.)

In the case of the above-described WSIR, when a vehicle occupant removes a tongue plate from a buckle device and the webbing is taken-up onto the spool by urging force, rotation of the spool in the webbing take-up direction is stopped at the point in time when the entire amount of the webbing is taken-up. Conversely, the inertia plate assembled to the V gear attempts to rotate as is in the webbing take-up direction due to its own inertial force. Thus, relative rotation arises between the inertia plate and the spool, and the pawl may engage with the internal teeth in the resin cover. As a result, there is the possibility that the lock plate will be guided by the guide hole of the V gear and the lock teeth of the lock plate will engage with the internal ratchets of the frame such that a locked state arises, and a state in which the webbing cannot be pulled-out thereafter (so-called end lock) will arise.

SUMMARY OF THE INVENTION

In view of the aforementioned, an object of the present invention is to provide a webbing retractor which can suppress or prevent the occurrence of end lock in a WSIR.

A first aspect of the present invention provides a webbing retractor comprising: a take-up shaft taking-up a webbing in a form of a roll by urging force; an inertia plate provided integrally and coaxially with an axial end side of the take-up shaft; and an inertial force imparting mechanism, wherein in a case in which a webbing for restraining a vehicle occupant is suddenly pulled-out, the take-up shaft takes-up the webbing, and the inertia plate causes a rotational delay with respect to the take-up shaft, and rotation of the take-up shaft in a webbing pull-out direction is thereby locked, and the inertial force imparting mechanism one of suppresses and deters rotation of the inertia plate in a webbing take-up rotation direction by the inertial force imparting mechanism applying inertial force in a webbing pull-out rotation direction to the inertia plate which attempts to rotate in a webbing take-up direction due to inertial force even after rotation of the take-up shaft in the webbing take-up rotation direction has stopped when a vehicle occupant cancels an applied state of the webbing and an entire amount of the webbing is taken-up onto the take-up shaft by urging force.

When a webbing for restraining a vehicle occupant is suddenly pulled-out, the inertia plate, which is provided integrally and coaxially with an axial end side of the take-up shaft, causes a rotation delay with respect to the take-up shaft. In this way, rotation of the take-up shaft in the webbing pull-out direction is impeded, and a locked state arises.

Here, when the vehicle occupant cancels the state in which the webbing is applied to him/her and lets go of the webbing, the entire amount of the webbing is taken-up onto the take-up shaft by urging force. At this time, the take-up shaft stops rotating in the webbing take-up direction at the point in time when the take-up shaft has taken-up the entire amount of the webbing. However, the inertia plate, which is disposed coaxially to the take-up shaft, attempts to rotate in the webbing take-up rotation direction even after the take-up shaft has stopped rotating in the webbing take-up direction. When this state progresses, a state, which effectively is the same as when the inertia plate causes a rotation delay with respect to the take-up shaft, arises, and rotation of the take-up shaft in the webbing pull-out direction is locked. However, in the present invention, when the take-up shaft stops rotating in the webbing take-up direction, inertial force in the webbing pull-out rotation direction is applied to the inertia plate by the inertial force imparting mechanism. As a result, at the time when the state in which the entire amount of the webbing is taken-up arises, rotation of the inertia plate in the webbing take-up rotation direction can be suppressed or deterred.

A second aspect of the present invention provides a webbing retractor comprising: a take-up shaft taking-up a webbing for restraining a vehicle occupant; a frame which is fixed to a vehicle and which rotatably supports both end portions of the take-up shaft, and lock teeth are formed at surfaces of the frame which surfaces intersect the end portions of the take-up shaft; a lock plate provided at at least one end portion side of the take-up shaft, and able to move between a position of engagement with the lock teeth and a position of non-engagement with the lock teeth, and due to the lock plate engaging with the lock teeth, the lock plate impedes rotation of the take-up shaft in a webbing pull-out direction; a lock wheel provided coaxially at one end portion side of the take-up shaft, the lock wheel usually rotating integrally with the take-up shaft and holding the lock plate at the position of non-engagement, and when relative rotation arises between the take-up shaft and the lock wheel, the lock wheel moves the lock plate to the position of engagement; a lock operating mechanism provided integrally and coaxially with an axial end side of the take-up shaft, and having an inertia plate which is provided so as to be swingable, and stopping rotation of the take-up shaft in a webbing pull-out rotation direction; and an inertial force imparting mechanism which one of suppresses and deters rotation, in a webbing take-up rotation direction, of the inertia plate which attempts to rotate in a webbing take-up direction due to inertial force even after rotation of the take-up shaft in the webbing take-up direction has stopped.

Usually, the inertia plate rotates integrally with the lock wheel, and the pawl is held at the position of non-engagement with the engagement teeth. Thus, rotation of the lock wheel in the webbing pull-out direction is not impeded. Therefore, the lock wheel is rotated integrally with the take-up shaft, and relative rotation does not arise therebetween. Accordingly, the lock plate is held by the lock wheel at a position of being set apart from the lock teeth of the frame, i.e., is held at a position of non-engagement. Accordingly, in this state, both pulling-out of the webbing from the take-up shaft and taking-up of the webbing onto the take-up shaft can be carried out freely.

On the other hand, when the webbing is pulled-out suddenly, the lock operating mechanism is operated. Namely, although the take-up shaft attempts to rotate suddenly in the webbing pull-out rotation direction, the inertia plate attempts to remain at that position, and therefore, a delay in rotation arises at the inertia plate. In this way, the pawl is swung from the position of non-engagement to the position of engagement, and engages with the internal tooth provided at the lock operating mechanism. Therefore, rotation of the lock wheel in the webbing pull-out direction is stopped, and relative rotation arises between the lock wheel and the take-up shaft. As a result, the lock plate engages with the lock teeth of the frame. In this way, rotation of the take-up shaft in the webbing pull-out direction is impeded, and a locked state arises.

Here, when the vehicle occupant cancels the state in which the webbing is applied to him/her and lets go of the webbing, the entire amount of the webbing is taken-up on the take-up shaft by urging force. At this time, the take-up shaft stops rotating in the webbing take-up direction at the point in time when the take-up shaft has taken-up the entire amount of the webbing. However, the inertia plate, which is disposed coaxially with respect to the lock wheel, is provided so as to be relatively rotatable within a predetermined range. Thus, the inertia plate attempts to rotate in the webbing take-up rotation direction even after the take-up shaft has stopped rotating in the webbing take-up direction. When this state progresses, the pawl engages with the engagement tooth due to the inertia plate, and relative rotation arises between the take-up shaft and the lock wheel, and a locked state arises. However, in the present invention, when the take-up shaft stops rotating in the webbing take-up direction, inertial force in the webbing pull-out rotation direction is applied to the inertia plate by the inertial force imparting mechanism. As a result, at the time when the state in which the entire amount of the webbing is taken-up arises, rotation of the inertia plate in the webbing take-up rotation direction can be suppressed or deterred.

A third aspect of the present invention provides a method of one of suppressing and deterring end lock in a webbing retractor having a take-up shaft which takes-up a webbing, a first inertia member provided integrally and coaxially with an axial end side of the take-up shaft and provided so as to be swingable, and a second inertia member rotatably disposed at a position at which the second inertia member can engage with the first inertia member, the method comprising the steps of: (a) making the second inertia member and the first inertia member, which attempts to rotate in a webbing take-up direction due to inertial force even after rotation of the take-up shaft in the webbing take-up direction has stopped, engage together; and (b) imparting, by the second inertia member, pushing force in a webbing pull-out rotation direction to the first inertia member.

DETAILED DESCRIPTION OF THE INVENTION

Hereinafter, a webbing retractor 10 relating to an embodiment of the present invention will be described with reference to FIGS. 1 through 8B.

Overall Structure of Webbing Retractor 10

First, the overall structure of the webbing retractor 10 relating to the present embodiment will be described, and thereafter, main portions of the webbing retractor 10 will be described.

Figure 1:
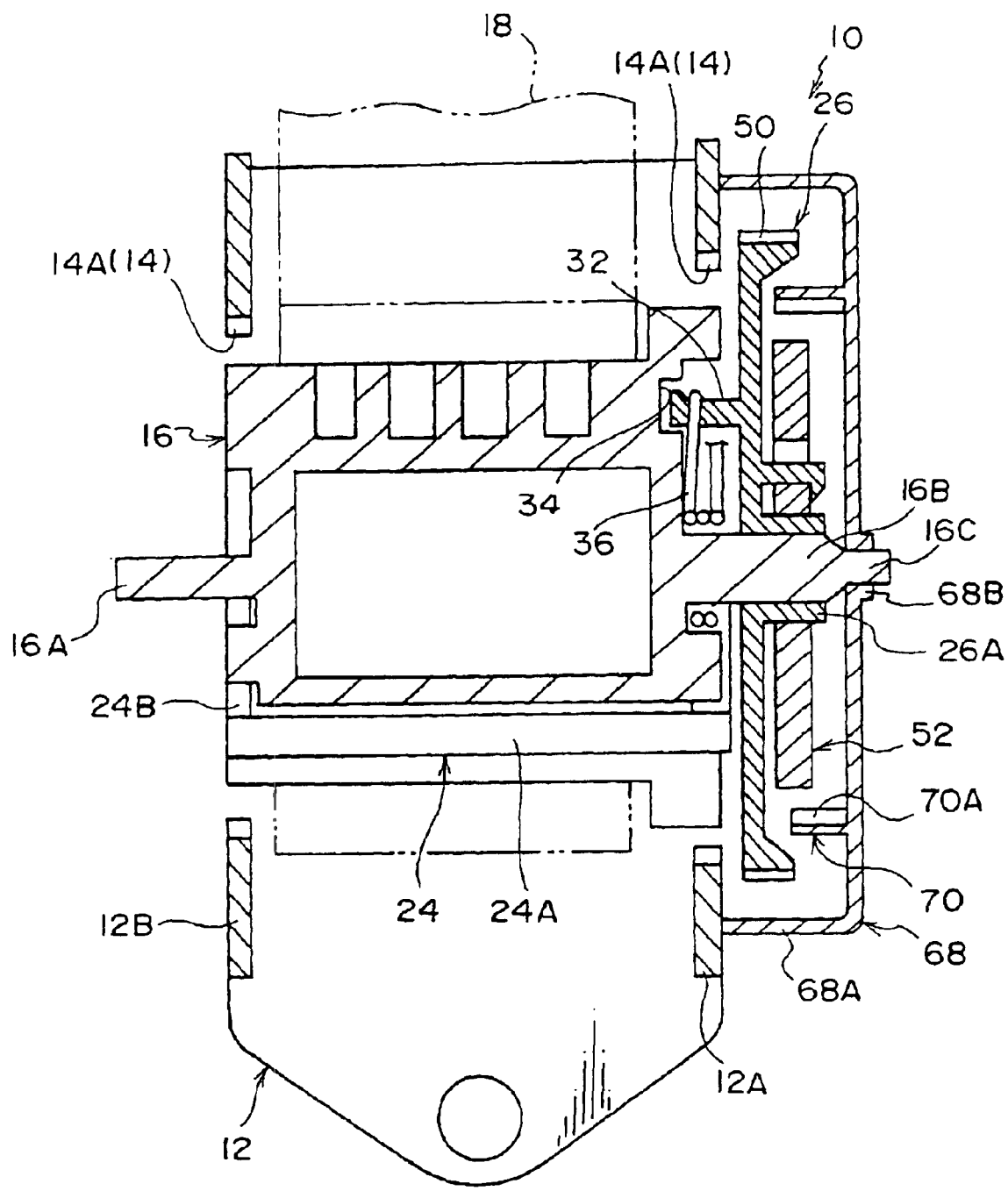
FIG. 1 is a schematic sectional view showing the overall structure of a webbing retractor relating to an embodiment of the present invention.
Figure 2:
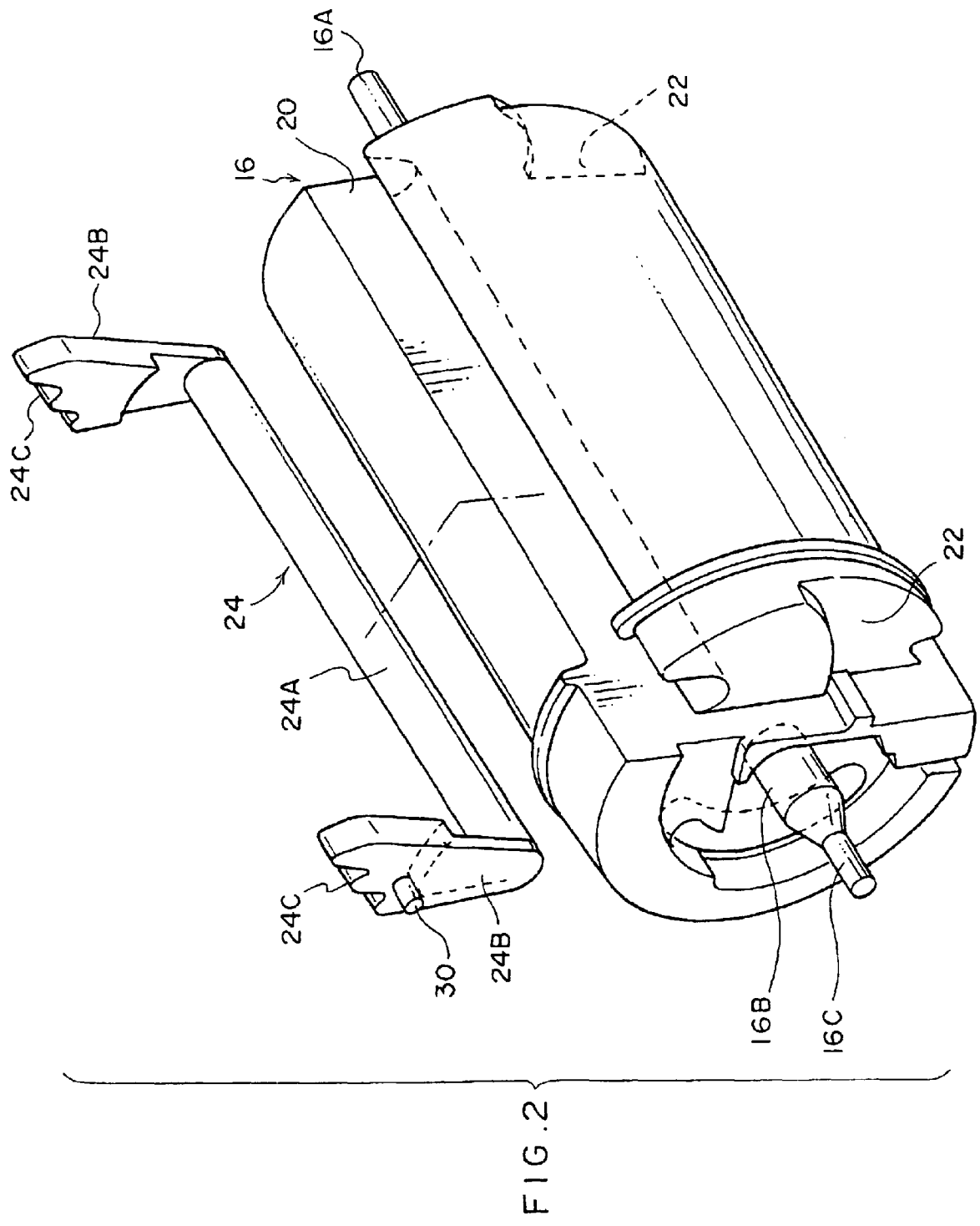
FIG. 2 is a perspective view showing a spool and a lock plate shown in FIG. 1, with the spool and the lock plate separated from one another.

Across-sectional view of the overall structure of the webbing retractor 10 relating to the present embodiment is shown in FIG. 1. A perspective view, in which a spool and a lock plate are separated, is shown in FIG. 2. States before and after operation of a W sensor of a WSIR are shown in side views in FIGS. 3 and 4. States before and after locking by the lock plate are shown in side views in FIGS. 5 and 6. Note that direction A marked for convenience in FIGS. 3 through 7 denotes the webbing pull-out rotation direction, whereas direction B denotes the webbing take-up rotation direction.

As shown in FIG. 1, the webbing retractor 10 has a frame 12 which is formed of metal and which is substantially U shaped in plan view. The frame 12 is fixed by bolts to the lower end portion of a side portion of the vehicle body. Internal ratchets 14, which are very strong and serve as lock teeth, are formed coaxially by punching in side portions 12A, 12B of the frame 12.

A spool 16, which is cylindrical and serves as a take-up shaft, is pivotally supported at the side portions 12A, 12B of the frame 12. A rotating shaft 16A is formed integrally with one axial direction end portion of the spool 16 at the axially central portion of the spool 16. The inner end of an unillustrated power spring (which is an element which can be interpreted in the broader sense as an urging mechanism) is anchored on the rotating shaft 16A. In this way, the spool 16 is usually urged to rotate in the webbing take-up rotation direction (direction B). On the other hand, a rotating shaft 16B is formed integrally at the other axial direction end portion of the spool 16, so as to be coaxial with the rotating shaft 16A. A small diameter shaft 16C is formed integrally and coaxially at the distal end of the rotating shaft 16B. The spool 16 is freely rotatably supported, at this small diameter shaft 16C, by a shaft receiving portion 68B which is formed at a sensor holder 68 which will be described later. Moreover, the proximal end portion of a webbing 18 for restraining a vehicle occupant is anchored to the spool 16. The webbing 18 is freely taken-up and pulled-out due to the spool 16 rotating.

Moreover, as shown in FIG. 2, a cut-out 20 is formed along the axial direction in the outer peripheral portion of the spool 16. The cut-out 20 is formed along the axial direction along the entire length of the spool 16, except for at the rotating shafts 16A, 16B and the small diameter shaft 16C. The floor portion of the cut-out 20 is formed in the shape of a semicircular-shaped surface. Moreover, concave portions 22 are formed at the axial direction end portions of the spool 16.

A lock plate 24, which is substantially U shaped as seen in plan view, is accommodated in the cut-out 20 and the concave portions 22 of the spool 16. The lock plate 24 is structured by a connecting shaft 24A which is shaped as a rod, and a pair of plates 24B which are formed integrally at the axial direction end portions of the connecting shaft 24A and extend parallel to one another outwardly in the radial direction. The connecting shaft 24A of the lock plate 24 is accommodated at the floor portion of the cut-out 20 of the spool 16, so as to be able to rotate around the axis. The pair of plates 24B are accommodated or housed in the pair of concave portions 22 which are formed at the axial direction end portions of the spool 16. Lock teeth 24C, which can engage with ratchet teeth 14A of the aforementioned internal ratchets 14, are formed at the distal end portions of the plates 24B.

In the state in which the pair of plates 24B are completely accommodated within the pair of concave portions 22, the lock teeth 24C are held at positions of being separated from the ratchet teeth 14A. This position is the non-engaged position of the lock plate 24 (see FIG. 5). On the other hand, due to the connecting shaft 24A of the lock plate 24 swinging around the floor portion of the cut-out 20 and the pair of plates 24B coming out from the pair of concave portions 22, the lock teeth 24C are engaged with the ratchet teeth 14A. This position is the engaged position of the lock plate 24 (see FIG. 6).

Figure 3:
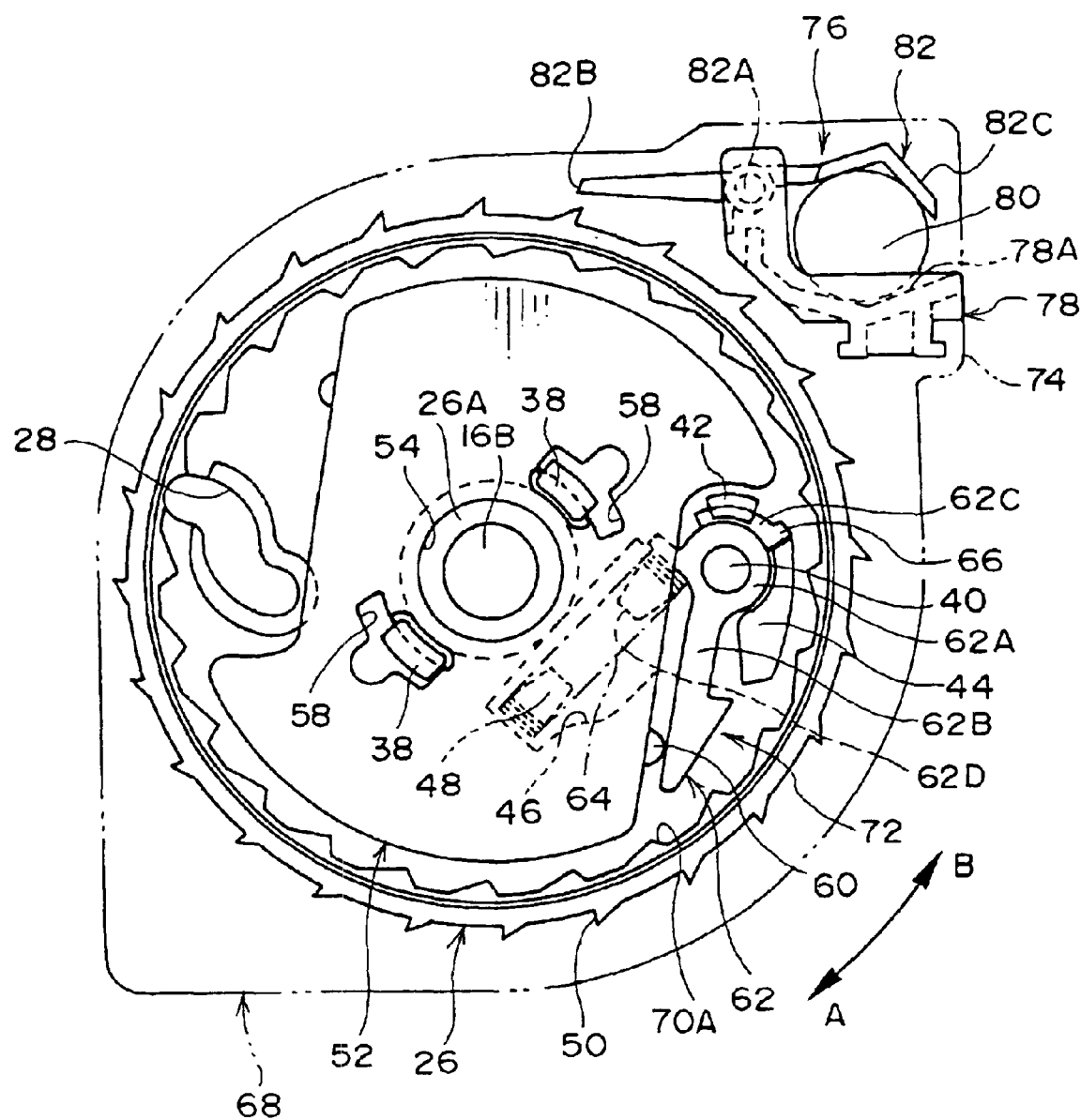
FIG. 3 is a side view showing a W sensor (in a non-operating state) and a V sensor of the webbing retractor relating to the embodiment of the present invention.
Figure 4:
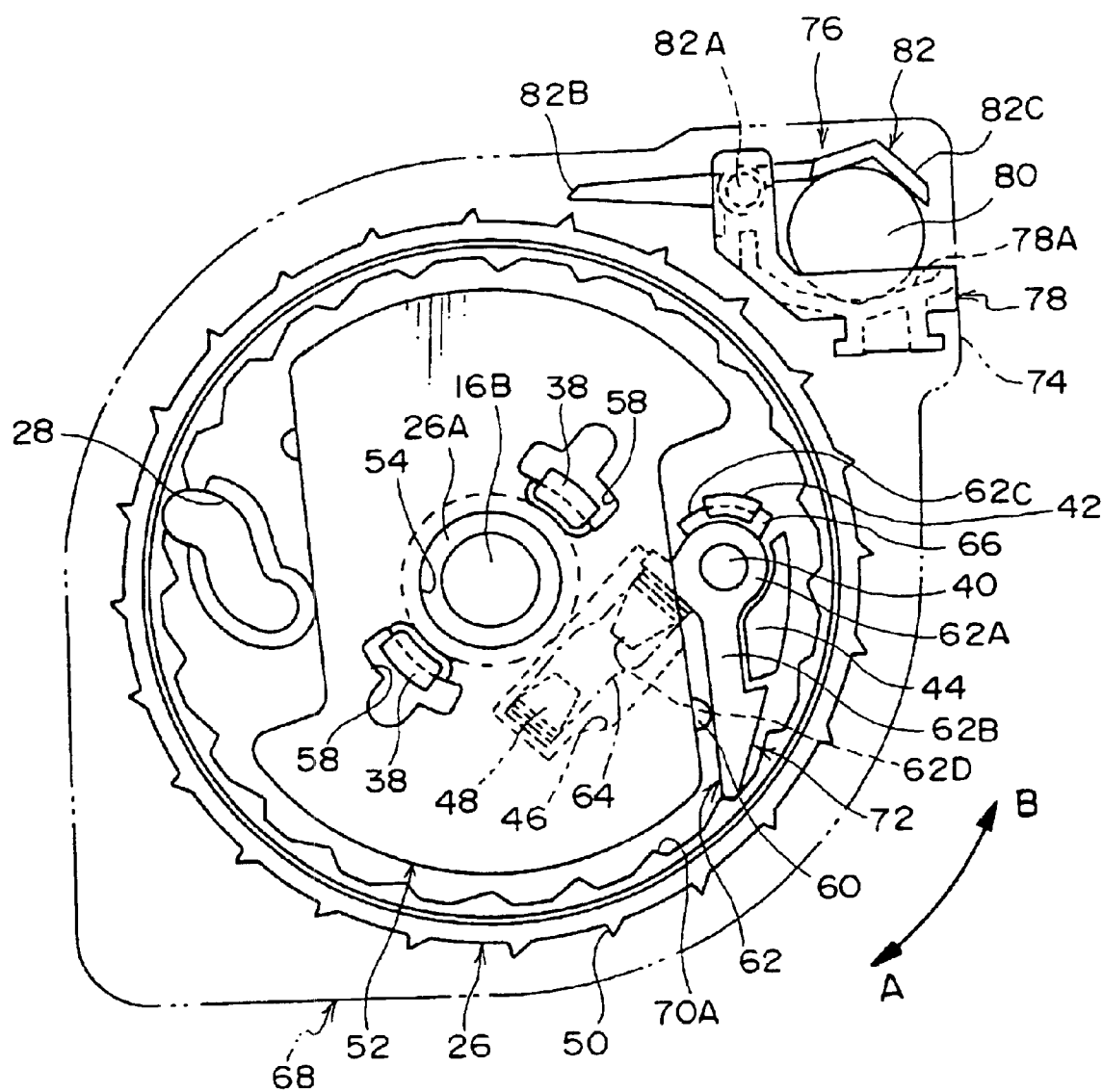
FIG. 4 is a side view showing the W sensor (in an operating state) and the V sensor of the webbing retractor relating to the embodiment of the present invention.
Figure 5:
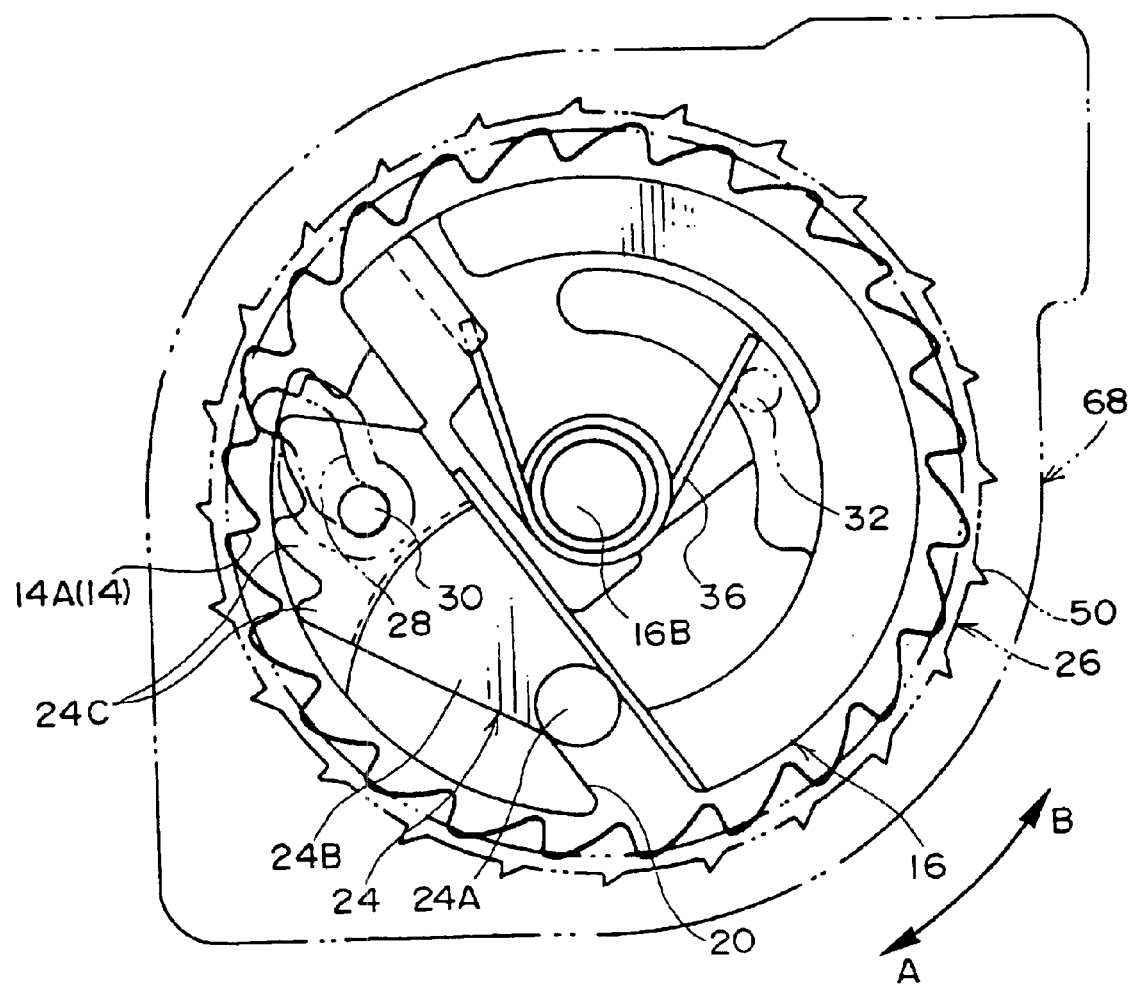
FIG. 5 is a side view showing a locking mechanism (in a non-operating state) of the webbing retractor relating to the embodiment of the present invention.
Figure 6:
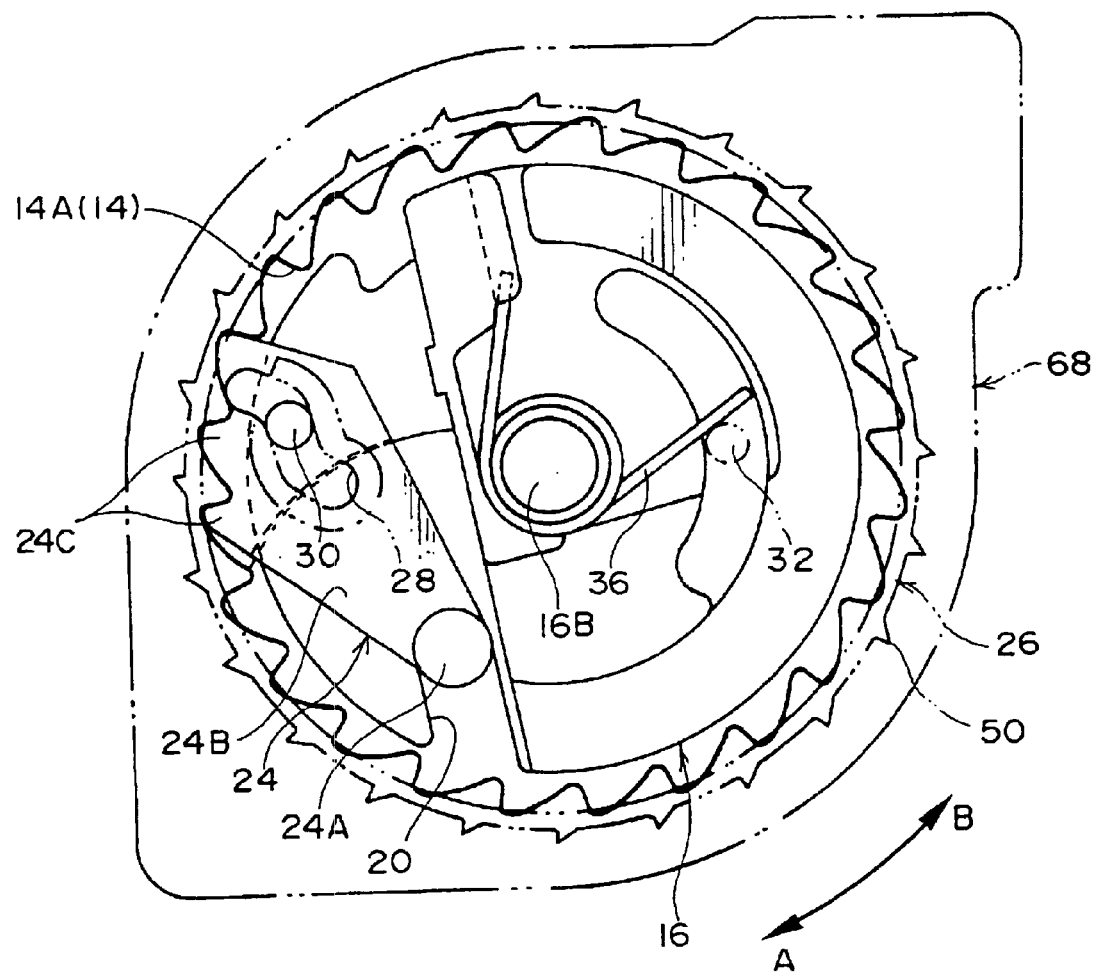
FIG. 6 is a side view showing the locking mechanism (in an operating state) of the webbing retractor relating to the embodiment of the present invention.

As shown in FIGS. 1, 3, and 4, a V gear 26 serving as a lock wheel is disposed at the outer side of the one side portion 12A of the frame 12. The V gear 26 is made of resin, and is substantially formed in the shape of a disc having a larger diameter than the outer diameter of the end portion of the spool 16. A cylindrical boss 26A, which has a pair of resin claws at the inner peripheral surface thereof, is formed at the axially central portion of the V gear 26. Due to the rotating shaft 16B of the spool 16 being inserted into the boss 26A, the V gear 26 is mounted, coaxially and freely rotatably, to one axial direction end portion of the spool 16.

A substantially backward S shaped guide hole 28 is formed at a predetermined position at the outer peripheral side of the V gear 26. A guide pin 30 (see FIGS. 5 and 6), which stands erect at one of the plates 24B of the lock plate 24, is inserted in the guide hole 28. In this way, the V gear 26 can rotate, within a predetermined range of angles of rotation, relative to the spool 16. At the time when relative rotation between the V gear 26 and the spool 16 arises, the guide hole 28 moves the guide pin 30 from the inner side toward the outer side, and guides the lock teeth 24C of the lock plate 24 to positions at which they can engage with the ratchet teeth 14A of the internal ratchets 14 of the frame 12.

A supporting projection 32 (see FIGS. 1, 5 and 6) stands erect at the spool 16 side surface of the V gear 26, so as to be directed in the direction opposite the boss 26A. The distal end portion of the supporting projection 32 is inserted in a concave portion 34 formed in one axial direction end portion of the spool 16. In this state, one end portion of a torsion coil spring 36 (which is an element which can be interpreted in the broader sense as an urging mechanism) is anchored on the supporting projection 32. Note that the coil portion of the torsion coil spring 36 is disposed in a state of being wound on the rotating shaft 16B of the spool 16, and the other end portion of the torsion coil spring 36 is anchored on one axial direction end portion of the spool 16. In this way, usually, the V gear 26 rotates following rotation of the spool 16.

A pair of anchor portions 38 stand erect, parallel to the boss 26A, at the periphery of the boss 26A of the V gear 26. The anchor portions 38 are formed, as seen in plan view, in arc shapes which are coaxial with the boss 26A, and are formed at two places which are symmetrical with the boss 26A therebetween. A pawl shaft 40, which is shaped as a solid cylinder having a small diameter, stands erect at that same side surface of the V gear 26. The pawl shaft 40 is formed at a position which is substantially symmetrical to the aforementioned guide hole 28 with the boss 26A therebetween, and is a portion which is the supporting shaft of a pawl 62 which will be described later.

As shown in FIGS. 3 and 4, a pawl anchor portion 42 is formed integrally in the vicinity of the pawl shaft 40. The pawl anchor portion 42 is formed in the shape of an arc which is concentric with the pawl shaft 40 as seen in side view, and a resin claw is formed at the distal end portion of the pawl anchor portion 42. A pawl stopper 44, which corresponds to the configuration of the pawl 62 which will be described later, is formed integrally in a vicinity of the pawl shaft 40. Moreover, a spring hole 46, which is shaped as an elongated hole, is formed in the V gear 26 in a vicinity of the pawl shaft 40. A spring receiving portion 48, which is substantially shaped as a solid cylindrical projection, is formed integrally at one end portion of the spring hole 46.

External teeth 50 are formed integrally at the outer peripheral portion of the V gear 26. An engaging portion 82B of a sensor lever 82 of a V sensor 76, which will be described later, can engage with the external teeth 50.

As shown in FIGS. 1, 3 and 4, an inertia plate 52 (first inertia member) formed of resin is disposed coaxially at the outer side of the V gear 26. The inertia plate 52 is substantially shaped as a disc whose outer periphery is cut-out at two places. A pivotally supporting hole (circular hole) 54 is formed at the axially central portion of the inertia plate 52. A pair of arc-shaped anchor holes 58 are formed at the outer side of the pivotally supporting hole 54 at opposing positions in the radial direction. The boss 26A of the V gear 26 is inserted in the pivotally supporting hole 54, and the pair of anchor portions 38 of the V gear 26 are inserted in the pair of anchor holes 58. In this way, the pair of anchor portions 38 are elastically anchored, and the inertia plate 52 is mounted coaxially and integrally to the V gear 26. Moreover, the peripheral direction lengths (the lengths of the arcs) of the anchor holes 58 are set to be longer than the peripheral direction lengths (the lengths of the arcs) of the anchor portions 38. In the state after assembly, the inertia plate 52 can rotate relative to the V gear 26 in the webbing take-up rotation direction (i.e., direction B) within the range of the difference in the lengths of the arcs (the angle of circumference). Moreover, linear engagement projections 60 are formed integrally with the cut-out side end surfaces of the inertia plate 52.

The pawl 62 is swingably supported at the pawl shaft 40 of the V gear 26. The pawl 62 is structured by a shaft-supported portion 62A, an arm portion 62B, an anchor piece 62C, and a spring receiving portion 62D. The shaft-supported portion 62A is cylindrical, and is pivotally supported at the pawl shaft 40. The arm portion 62B extends from the shaft-supported portion 62A, and a claw is formed at the distal end side surface of the arm portion 62B. The anchor piece 62C is formed at the outer periphery of the lower portion of the shaft-supported portion 62A. The spring receiving portion 62D extends from the shaft-supported side of the lower edge of the arm portion 62B.

In the state in which the pawl shaft 40 is inserted in the shaft-supported portion 62A, the anchor piece 62C is anchored at the pawl anchor portion 38 of the V gear 26, such that the pawl 62 cannot be pulled-off in the axial direction. Moreover, one end portion of a compression coil spring 64, which can be interpreted in the broader sense as an urging mechanism, is anchored on the spring receiving portion 62D by the spring receiving portion 62D being inserted therethrough. The other end portion of the compression coil spring 64 is anchored on the spring receiving portion 48 of the V gear 26 by the spring receiving portion 48 being inserted therethrough. The compression coil spring 64 is accommodated, in a compressed state, in the spring hole 46 formed in the V gear 26. Accordingly, the compression coil spring 64 urges the pawl 62 to rotate clockwise around the pawl shaft 40. Moreover, a small projection 66, which can abut the aforementioned pawl stopper 44 which is formed at the V gear 26, is formed integrally at the anchor piece 62C end portion of the pawl 62. The small projection 66 is a stopper at the time when the pawl 62 rotates clockwise around the pawl shaft 40 due to the urging force of the compression coil spring 64. In this way, the pawl 62 usually rotates integrally with the V gear 26 without swinging (i.e., revolves around the rotating shaft 16B).

On the other hand, when the pawl 62 rotates counterclockwise around the pawl shaft 40 against the urging force of the compression coil spring 64, the arm portion 62B abuts the side surface of the pawl stopper 44, such that further swinging is impeded. In this way, the range over which the pawl 62 can swing (the angle of rotation of the pawl 62) is restricted.

Further, the sensor holder 68, which is made of resin and is formed in the shape of a flat cup, is attached to the outer side of the one side portion 12A of the frame 12. A tube portion 70 of a predetermined height is formed at the floor portion of the sensor holder 68. Internal teeth 70A serving as engagement teeth are formed integrally at the inner peripheral surface of the tube portion 70. In the state after assembly, the peripheral wall portion of the V gear 26 is disposed so as to be rotatable in the space between an outer peripheral wall 68A and the tube portion 70 of the sensor holder 68 (see FIG. 1). Further, in the state in which the inertia plate 52 is accommodated in the tube portion 70, the pawl 62 is disposed so as to oppose the internal teeth 70A of the tube portion 70. When the pawl 62 swings around the pawl shaft 40 against the urging force of the compression coil spring 64, the distal end portion of the arm portion 62B of the pawl 62 engages with the internal tooth 70A.

In the above-described structure, the inertia plate 52, the pawl 62, the compression coil spring 64, and the internal teeth 70A form a W sensor 72 which structures a WSIR, and correspond to the lock operating mechanism of the present invention.

Moreover, a holder portion 74, which is hollow and substantially parallelepiped, is formed integrally at the upper end portion of the outer periphery of the sensor holder 68. The V sensor (i.e., an acceleration sensor) 76 is accommodated in the holder portion 74. Note that the V sensor 76 is not shown in FIG. 1.

As shown in FIGS. 3 and 4, the V sensor 76 has a housing 78. The housing 78 is formed in a substantial L shape as seen in side view. A rolling surface 78A, which is shaped as a concave surface, is formed at the center of the floor portion of the housing 78. The housing 78 is attached to the holder portion 74 from the side. A ball 80 is placed on the rolling surface 78A. Moreover, the sensor lever 82 is swingably supported at the upper end portion of the housing 78. The sensor lever 82 has a support shaft 82A which is pivotally supported at the upper end portion of the housing 78; the engaging portion 82B which, in an assembled state, extends from the support shaft 82A toward the V gear 26 side and can engage with the external teeth 50 of the V gear 26; and an abutment portion 82C which is dish-shaped and extends at the side of the support shaft 82A opposite the side at which the engaging portion 82B is provided. The abutment portion 82C rests on the ball 80 due to its own weight, and in this state, the engaging portion 82B is held at a position of non-engagement at which the engaging portion 82B is set apart from the external teeth 50 of the V gear 26. On the other hand, at the time of a rapid deceleration of the vehicle, due to the ball 80 rolling on the rolling surface 78A, the sensor lever 82 swings around the support shaft 82A. In this way, the engaging portion 82B engages with the external tooth 50 of the V gear 26.

Structure of Main Portions of Webbing Retractor 10

Figure 7:
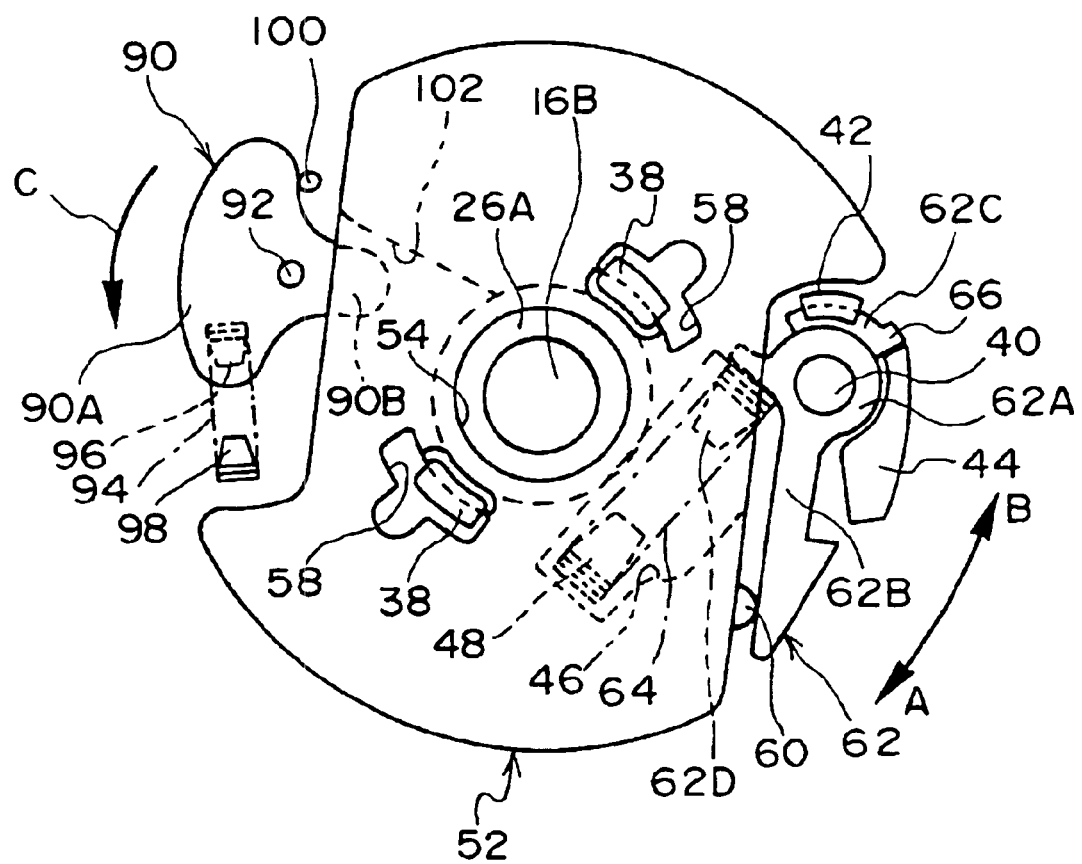
FIG. 7 is a schematic side view showing the structure of main portions of the webbing retractor relating to the embodiment of the present invention.

Main portions of the webbing retractor 10 relating to the present embodiment are shown in side view in FIG. 7. Note that illustration of these portions is omitted from FIGS. 3 through 6 which were used in the above explanation. As shown in FIG. 7, another small inertia plate 90 (second inertia member) formed of resin is disposed at a position which is at the side of the shaft supporting hole 54 of the inertia plate 52 opposite the side at which the pawl 62 is provided. The small inertia plate 90 is formed in a substantial T shape, and is structured by a head portion 90A and an extending portion 90B which extends perpendicularly from the center of the head portion 90A. The small inertia plate 90 is, at the proximal ("root") side of the extending portion 90B, pivotally supported at the V gear 26 so as to be swingable around a support shaft 92. Accordingly, the small inertia plate 90 rotates, together with the inertia plate 52, integrally with the V gear 26 (i.e., revolves around the boss 26A of the V gear 26).

The head portion 90A of the small inertia plate 90 is formed to be thick. On the other hand, the extending portion 90B is formed to be thin. Accordingly, at the small inertia plate 90, the mass of the head portion 90A is greater than the mass of the extending portion 90B. Therefore, even if a compression coil spring 94 (which will be described later) is not provided, the small inertia plate 90 is swung in the direction of arrow C around the support shaft 92 due to the difference in masses. Note that the difference in the thicknesses of the head portion 90A and the extending portion 90B is provided at the reverse surface side of the small inertia plate 90.

Moreover, a spring receiving portion 96, which is substantially shaped as a solid cylindrical projection, is formed integrally at the reverse surface side of the head portion 90A of the small inertia plate 90. Correspondingly, at the V gear 26 as well, a spring receiving portion 98, which is substantially shaped as a solid cylindrical projection, is formed integrally at a position opposing the spring receiving portion 96. The compression coil spring 94, which can be interpreted in the broader sense as an urging mechanism, is anchored at the spring receiving portions 96, 98 by the spring receiving portions 96, 98 being inserted in the compression coil spring 94. Accordingly, the compression coil spring 94 urges the head portion 90A of the small inertia plate 90 to rotate clockwise (i.e., in the direction opposite to the direction of arrow C) around the support shaft 92. Further, a stopper pin 100 stands erect at a predetermined position of the V gear 26 (at the side in the direction in which the head portion 90A is urged). The stopper pin 100 prescribes the initial position of the small inertia plate 90. Note that another urging mechanism, such as a torsion coil spring or the like, may be used instead of the compression coil spring 94.

Further, an inclined wall 102 is formed at the reverse surface side of the inertia plate 52, at a position of interfering with the locus of swinging of the distal end portion of the extending portion 90B of the small inertia plate 90. The inclined wall 102 is formed as a portion which, when the small inertia plate 90 swings in the direction of arrow C around the support shaft 92, slides relative to the distal end portion of the extending portion 90B and receives the inertial force (pressing force) in the webbing pull-out rotation direction (the direction of arrow A) at the inertia plate 52.

Next, operation of the present embodiment will be described.

In the webbing retractor 10, usually, the pawl 62 of the W sensor 72 is urged to rotate clockwise around the pawl shaft 40 by the urging force of the compression coil spring 64, and the sensor lever 82 of the V sensor 76 is held on the ball 80 due to its own weight. Thus, the W sensor 72 and the V sensor 76 do not operate. Therefore, in the state in which the spool 16 accommodates the lock plate 24, the spool 16 can rotate freely in both the webbing pull-out rotation direction and the webbing take-up rotation direction.

On the other hand, when the webbing 18 is suddenly pulled-out or a state of rapid deceleration of the vehicle arises, the W sensor 72 or the V sensor 76 operates.

Hereinafter, operation of the respective portions will be summarized in this order.

Case in which the W Sensor 72 Operates

When the webbing 18 is suddenly pulled-out, the spool 16 and the V gear 26 are rotated at high speed in the webbing pull-out rotation direction (direction A). At this time, the inertia plate 52 cannot follow the V gear 26. Thus, an inertial delay arises at the inertia plate 52 against the urging force of the compression coil spring 64, and the inertia plate 52 rotates in the webbing take-up rotation direction B relative to the V gear 26. When the inertia plate 52 rotates in direction B relative to the V gear 26, the pawl 62, which the engaging projection 60 of the inertia plate 52 abuts (engages), is pushed and swung in direction B and engages the internal tooth 70A of the sensor holder 68, such that rotation of the V gear 26 in direction A is impeded (the state shown in FIG. 4).

When rotation of the V gear 26 in direction A is impeded, subsequently, relative rotation arises between the V gear 26 and the spool 16 to which the webbing tensile force is being applied. The guide pin 30 (see FIGS. 2 and 5) is guided to the outer end side of the guide hole 28 of the V gear 26. In this way, the lock teeth 24C of the lock plate 24 are guided to positions at which they can engage with the ratchet teeth 14A of the internal ratchets 14, such that a lock standby state, i.e., a state in which the addendum of the lock teeth 24C engage with the addendum of the ratchet teeth 14A of the internal ratchets 14, arises.

When the addendum of the claws of the pair of lock teeth 24C of the lock plate 24 are guided to positions at which they can engage with the addendum of the ratchet teeth 14A of the pair of internal ratchets 14, as the spool 16 rotates further in direction A, the addendum of the lock teeth 24C are guided by the ratchet teeth 14A and reach the teeth bottoms of the ratchet teeth 14A. In this way, the lock plate 24 is reliably locked by the internal ratchets 14, and rotation of the spool 16 in the webbing pull-out rotation direction (direction A) is impeded, and further pulling-out of the webbing 18 is limited. Namely, after the lock teeth 24C are guided to positions at which they can engage with the internal ratchets 14, the spool 16 (the lock plate 24) is self-locked.

On the other hand, when, after the impeding of the pulling-out of the webbing 18, the tension applied to the webbing 18 decreases and the spool 16 is rotated by a predetermined angle in the webbing take-up rotation direction (direction B) (i.e., when a predetermined amount of the webbing 18 is taken-up), the engaged state of the lock plate 24 and the internal ratchets 14 is cancelled. Namely, when the spool 16 is rotated in direction B, due to the lock plate 24 being pushed at the connecting shaft 24A by the cut-out 20 of the spool 16, the lock teeth 24C are made to move away from the respective internal ratchets 14, and are, together with the V gear 26, returned to their initial positions due to the urging force of the torsion coil spring 36. Note that the taking-up of the webbing 18 after the tension applied to the webbing 18 decreases is achieved by the unillustrated power spring which is connected to the rotating shaft 16A of the spool 16.

Case in which the V Sensor 76 Operates

When a state of rapid deceleration of the vehicle arises, due to the inertial force accompanying the rapid deceleration, the ball 80 of the V sensor 76 rolls on the rolling surface 78A of the housing 78. The abutment portion 82C of the sensor lever 82, which abuts and rests on the ball 80, swings upward. Thus, the engaging portion 82B, which is positioned at the side of the support shaft 82A opposite the side at which the abutment portion 82C is provided, swings downward, and engages with the external tooth 50 of the V gear 26. In this way, rotation of the V gear 26 in the webbing pull-out rotation direction is impeded. Therefore, relative rotation arises between the V gear 26 and the spool 16. The operation thereafter is similar to that of the above-described case of the W sensor 72, and will therefore be omitted.

Here, when the vehicle occupant cancels the state in which the webbing 18 is applied to him/her and lets go of the webbing 18, the entire amount of the webbing 18 is taken-up onto the spool 16 due to the urging force of the power spring. At this time, at the point in time when the entire amount of the webbing 18 is taken-up, the spool 16 stops rotating in the webbing take-up direction. However, the inertia plate 52, which is disposed coaxially with respect to the V gear 26, is provided so as to be relatively rotatable within a predetermined range. Thus, even after the spool 16 stops rotating in the webbing take-up direction, the inertia plate 52 attempts to rotate in the webbing take-up rotation direction. When this state progresses, the following may occur: the arm portion 62B of the pawl 62 is pushed by the engaging projection 60 of the inertia plate 52, the pawl 62 swings around the pawl shaft 40 against the urging force of the compression coil spring 64, the distal end portion of the arm portion 62B engages with the internal tooth 70A of the sensor holder 68, relative rotation arises between the spool 16 and the V gear 26, and a locked state arises.

However, in the present embodiment, when the spool 16 stops rotating in the webbing take-up direction, inertial force in the webbing pull-out rotation direction is applied to the inertia plate 52 by the small inertia plate 90. Specifically, as shown in FIG. 7, at the time when the state in which the entire amount of the webbing 18 is taken-up arises, not only is inertial force in the webbing take-up rotation direction (direction B) applied to the inertia plate 52, but inertial force in the same direction is applied to the small inertia plate 90 as well. Thus, the head portion 90A of the small inertia plate 90 is swung in the direction of arrow C around the support shaft 92 against the urging force of the compression coil spring 94. In this way, the extending portion 90B of the small inertia plate 90 is swung counterclockwise around the support shaft 92, and slides while pushing up the inclined wall 102 at the reverse surface of the inertia plate 52. Therefore, inertial force in the webbing pull-out rotation direction (direction A) is applied to the inertia plate 52 around the boss 26A of the V gear 26. Namely, the pushing force in the webbing pull-out rotation direction, which is applied to the inclined wall 102 of the inertia plate 52 on the basis of the inertial force in the webbing take-up rotation direction which is applied to the head portion 90A of the small inertia plate 90, is applied.

Accordingly, at the time when the state in which the entire amount of the webbing 18 is taken-up arises, inertial force in the webbing take-up rotation direction and inertial force in the webbing pull-out direction are simultaneously applied to the inertia plate 52, and offset one another. Accordingly, either the inertia plate 52 does not rotate relatively at all in the webbing take-up rotation direction, or even if it does rotate relatively, the amount of relative rotation is extremely small. As a result, in accordance with the webbing retractor 10 relating to the present embodiment, it is possible to suppress or prevent so-called end lock from arising in a WSIR.

Figure 8A:
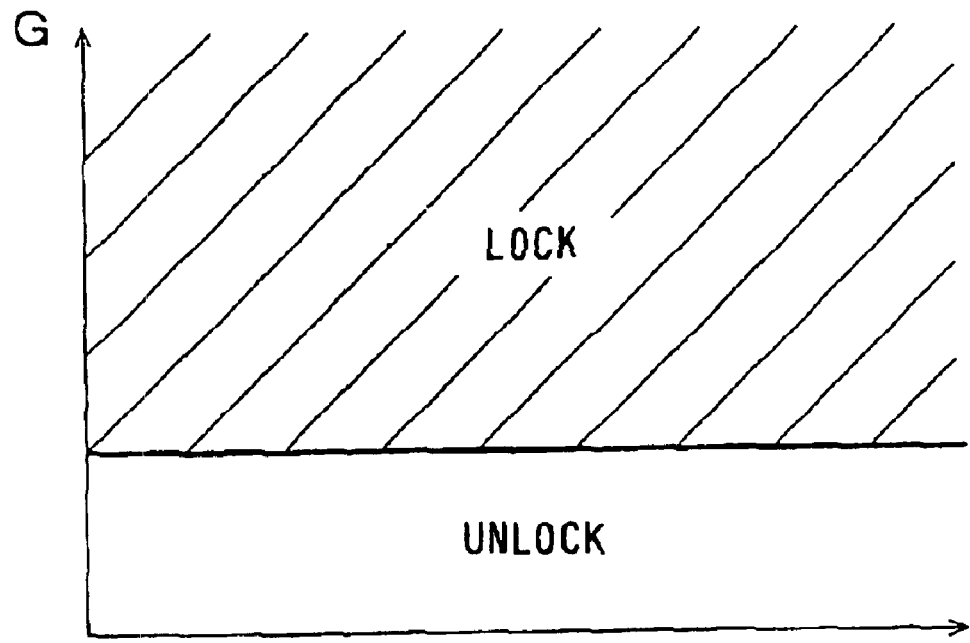
FIG. 8A is a graph showing end lock of a conventional webbing retractor.
Figure 8B:
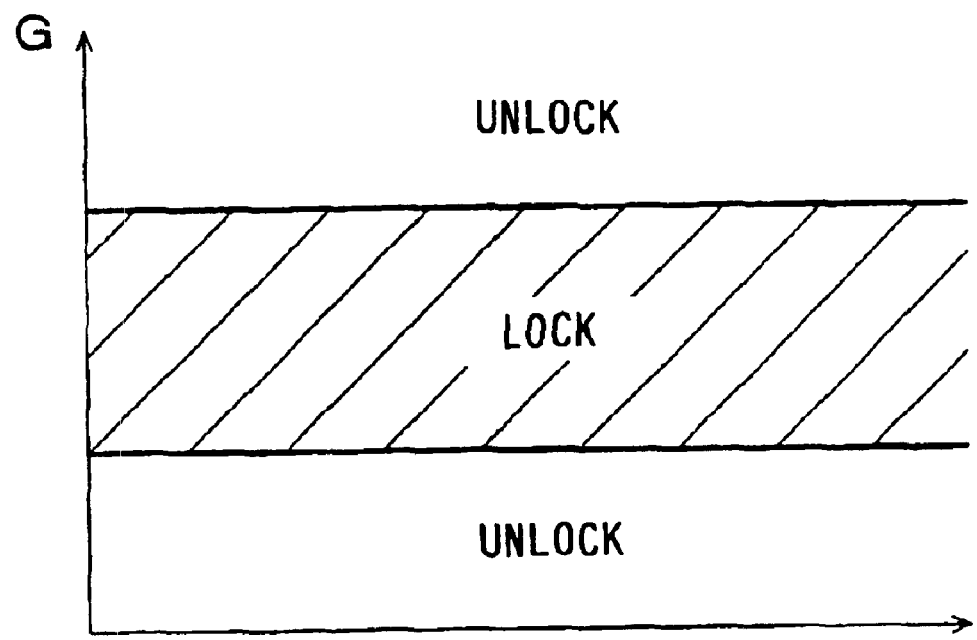
FIG. 8B is a graph showing end lock of the webbing retractor relating to the embodiment of the present invention.

Additional explanation regarding the effects of the above-described present embodiment will be given by using FIGS. 8A and 8B. As shown in FIG. 8A, conventionally, end lock easily arises both in a case in which the G applied to the webbing retractor is an intermediate level, and a case in which it is high. However, in the present embodiment, the W sensor 72 can be set in an unlocked state in the region of the high G applied when the entire amount of the webbing 18 is taken-up. The present embodiment is an improvement over the conventional structure with regard to this point. Generally, the G, which is applied at the time when the application of the webbing 18 is cancelled and the entire amount of the webbing 18 is suddenly taken-up onto the spool 16, is higher than the G which is applied to the webbing retractor 10 when the vehicle is in a collision. This is because, when the vehicle is in a collision, a large amount of energy is absorbed by deformation of the front portion of the body, or the like.

As described above, in the webbing retractor 10 relating to the present embodiment, by combining two WSIR locking mechanisms, at the time of an input of a high G, the additional locking mechanism operates such that the occurrence of end lock can be suppressed or prevented.

The webbing retractor 10 relating to the present embodiment uses the locking mechanism utilizing the lock plate 24 which is U shaped in plan view. However, the present invention is not limited to the same, and any of various locking mechanisms can be used.

Moreover, the above-described webbing retractor 10 relating to the present embodiment uses the substantially T-shaped small inertia plate 90 and the inclined wall 102. However, the present invention is not limited to the same, and any structure may be used provided that an inertial force, which cancels the inertial force in the webbing take-up rotation direction applied to the inertia plate 52 at the time when the entire amount of the webbing 18 is taken-up, can be applied to the inertia plate 52.

As described above, the webbing retractor relating to the embodiment of the present invention is provided with an inertial force imparting mechanism which suppresses or deters rotation of the inertia plate in the webbing take-up rotation direction by causing inertial force in the webbing pull-out rotation direction to be applied to the inertia plate which attempts to rotate in the webbing take-up rotation direction due to inertial force even after the rotation of the take-up shaft in the webbing take-up direction stops at the time when the vehicle occupant cancels the state in which the webbing is applied to him/her and the entire amount of the webbing is taken-up onto the take-up shaft by urging force. In this way, the webbing retractor of the present invention has the excellent effect of being able to suppress or prevent the occurrence of so-called end lock in a WSIR.

What is claimed is:

1. A webbing retractor comprising:
    a take-up shaft taking-up a webbing in a form of a roll by urging force;
    an inertia plate provided integrally and coaxially with an axial end side of the take-up shaft; and
    an inertial force imparting mechanism,
    wherein in a case in which a webbing for restraining a vehicle occupant is suddenly pulled-out, the take-up shaft unwinds the webbing, and the inertia plate causes a rotational delay with respect to the take-up shaft, and rotation of the take-up shaft in a webbing pull-out direction is thereby locked, and
    the inertial force imparting mechanism one of suppresses and deters rotation of the inertia plate in a webbing take-up rotation direction by directly contacting and directly applying an inertial force to the inertia plate in a webbing pull-out rotation direction when said inertia plate attempts to rotate in a webbing take-up direction due to inertial force even after rotation of the take-up shaft in the webbing take-up rotation direction has stopped when a vehicle occupant cancels an applied state of the webbing and an entire amount of the webbing is taken-up onto the take-up shaft by the urging force.

2. The webbing retractor of claim 1, wherein the inertial force imparting mechanism has a small inertia plate rotatably supported by a shaft, and an urging mechanism urging the small inertia plate to rotate around the shaft.

3. The webbing retractor of claim 2, wherein the small inertia plate one of suppresses and deters rotation of the inertia plate in the webbing take-up rotation direction by the small inertia plate engaging with and imparting pushing force in the webbing pull-out rotation direction to the inertia plate which attempts to rotate in the webbing take-up direction due to inertial force even after the rotation of the take-up shaft in the webbing take-up rotation direction has stopped.

4. The webbing refractor of claim 1, further comprising an acceleration sensor, wherein the acceleration sensor suppresses rotation of the take-up shaft in the webbing pull-out direction.

5. The webbing retractor of claim 1, wherein said inertial force imparting mechanism includes a movable inertia member that directly contacts said inertia plate.

6. A webbing retractor comprising:
a take-up shaft taking-up a webbing for restraining a vehicle occupant;
a frame which is fixed to a vehicle and which rotatably supports both end portions of the take-up shaft, and lock teeth are formed at surfaces of the frame which surfaces intersect the end portions of the take-up shaft;
a lock plate provided at at least one end portion side of the take-up shaft, and able to move between a position of engagement with the lock teeth and a position of non-engagement with the lock teeth, and due to the lock plate engaging with the lock teeth, the lock plate impedes rotation of the take-up shaft in a webbing pull-out direction;
a lock wheel provided coaxially at one end portion side of the take-up shaft, the lock wheel usually rotating integrally with the take-up shaft and holding the lock plate at the position of non-engagement, and when relative rotation arises between the take-up shaft and the lock wheel, the lock wheel moves the lock plate to the position of engagement;
a lock operating mechanism provided integrally and coaxially with an axial end side of the take-up shaft, and having an inertia plate which is provided so as to be swingable, and stopping rotation of the take-up shaft in a webbing pull-out rotation direction; and
an inertial force imparting mechanism which one of suppresses and deters rotation, in a webbing take-up rotation direction, of the inertia plate which attempts to rotate in a webbing take-up direction due to inertial force even after rotation of the take-up shaft in the webbing take-up direction has stopped, wherein said mechanism directly contacts and directly applies an inertial force to the inertia plate.

7. The webbing retractor of claim 6, wherein the lock operating mechanism and the inertial force imparting mechanism are disposed at positions which are symmetrical around an axial center of the take-up shaft.

8. The webbing refractor of claim 6, wherein the inertial force imparting mechanism one of suppresses and deters rotation of the inertia plate in the webbing take-up rotation direction by applying inertial force in the webbing pull-out rotation direction to the inertia plate which attempts to rotate in the webbing take-up direction due to inertial force even after rotation of the take-up shaft in the webbing take-up direction has stopped when an entire amount of the webbing is taken-up onto the take-up shaft by urging force.

9. The webbing retractor of claim 8, wherein the inertial force imparting mechanism has a small inertia plate rotatably supported by a shaft, and an urging mechanism urging the small inertia plate to rotate around the shaft.

10. The webbing retractor of claim 9, wherein the small inertia plate one of suppresses and deters rotation of the inertia plate in the webbing take-up rotation direction by the small inertia plate engaging with and imparting pushing force in the webbing pull-out rotation direction to the inertia plate which attempts to rotate in the webbing take-up direction due to inertial force even after the rotation of the take-up shaft in the webbing take-up direction has stopped.

11. The webbing retractor of claim 8, wherein the lock operating mechanism has a pawl supported at the lock wheel by a shaft so as to be swingable, engagement teeth with which the pawl can engage, and an urging mechanism urging the pawl to rotate in a webbing pull-out direction around the shaft.

12. The webbing retractor of claim 11, wherein the inertia plate is disposed coaxially to the lock wheel and is provided so as to be able to rotate relatively within a predetermined range, and usually, the inertia plate rotates integrally with the lock wheel and holds the pawl at a position of non-engagement with the engagement teeth, and when the webbing is suddenly pulled-out, the inertia plate causes a rotation delay with respect to the take-up shaft and makes the pawl engage with the engagement teeth, and thereby stops rotation of the lock wheel in the webbing pull-out direction.

13. The webbing retractor of claim 6, further comprising an acceleration sensor which includes a sensor lever, the acceleration sensor being disposed in a position in which the sensor lever is engagable with the lock wheel, wherein the sensor lever suppresses rotation of the lock wheel by engaging with the lock wheel.

14. The webbing retractor of claim 6, wherein the lock wheel is formed by a V gear.

15. The webbing retractor of claim 6, wherein said inertial force imparting mechanism includes a movable inertia member that directly contacts said inertia plate.

16. A method of one of suppressing and deterring end lock in a webbing retractor having a take-up shaft which takes-up a webbing, a first inertia member provided integrally and coaxially with an axial end side of the take-up shaft and provided so as to be swingable, and a second inertia member rotatably disposed at a position at which the second inertia member can engage with the first inertia member, the method comprising the steps of:
a. making the second inertia member and the first inertia member, which attempts to rotate in a webbing take-up direction due to inertial force even after rotation of the take-up shall in the webbing take-up direction has stopped, directly engage together; and
b. imparting, by the second inertia member, pushing force in a webbing pull-out rotation direction directly to the first inertia member.

* * * * *